Figure 2:
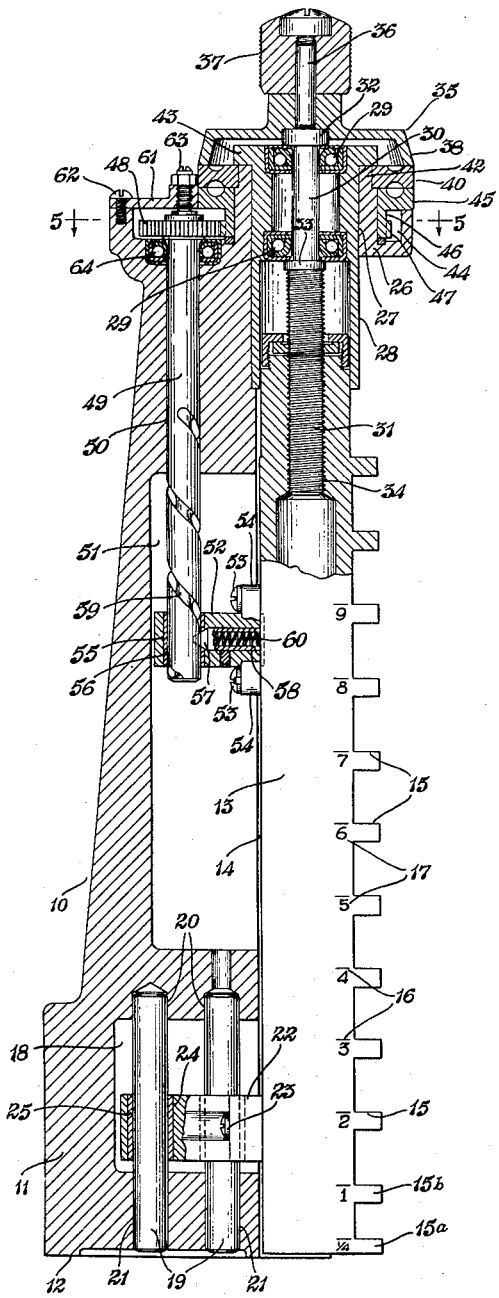

July 18, 1950   J. N. BENNETT   2,515,583
MICROMETER HEIGHT GAUGE

Filed April 18, 1947   2 Sheets-Sheet 1

Inventor
Joseph N. Bennett

By Freau and Bishop
Attorneys

July 18, 1950   J. N. BENNETT   2,515,583
MICROMETER HEIGHT GAUGE

Filed April 18, 1947   2 Sheets-Sheet 2

Inventor
Joseph N. Bennett
By Frease and Bishop
Attorneys

Patented July 18, 1950

2,515,583

UNITED STATES PATENT OFFICE 2,515,583

MICROMETER HEIGHT GAUGE

Joseph N. Bennett, Canton, Ohio

Application April 18, 1947, Serial No. 742,217

6 Claims. (Cl. 33—170)

The invention relates to an improved height gauge or vertical micrometer by means of which measurements may be accurately taken or determined down to one ten-thousandth of an inch.

It is an object of the invention to provide a height gauge for accurately establishing or determining centers, points or other measurements more readily and accurately than is possible with the present method of using a vernier height gauge or similar instrument.

Another object is to provide an instrument of this character having a vertically movable beam whereon a plurality of point finders or locaters are formed at definitely spaced apart units of measurement so that they may be selectively employed.

A further object is to provide such a height gauge wherein a vertically movable beam having such point finders or locaters thereon is moved by screw means having graduated means associated therewith for determining very slight movement of said beam as by $1/10{,}000$ of an inch.

A still further object is to provide a height gauge of this character in which the movement of the beam operates graduated means for determining greater movement of the beam as by $25/1000$ of an inch.

Another object is to provide such a height gauge in which said graduated measuring means are in the form of rotatable dials between which is located a stationary dial having a zero point into which both rotatable dials may be compared.

It is also an object of the invention to provide such a height gauge in which one of said graduated rotatable dials is connected to screw means which raises and lowers the beam and the other is operatively connected to means rotated by the movement of the beam.

Still another object is to provide a height gauge of this character in which a spirally grooved shaft is rotated by vertical movement of the beam, said shaft having means thereon operatively associated with one of said graduated dials for rotating the same.

A further object is to provide such a height gauge in which the spirally grooved shaft has a pinion thereon meshing with gear teeth upon one of the rotatable dials.

A still further object is to provide simple and efficient means for taking up play or lost motion in the screw means which operates the beam.

Another object is to provide a height gauge with a vertically adjustable beam having point finders or locaters in the form of steps or shoulders located thereon at definitely spaced apart units of measurement.

It is also an object of the invention to provide such a beam with graduations thereon at definitely spaced apart units of measurement.

A further object is to provide a height gauge of the character referred to comprising a vertical support of channel cross section provided with a flat lower surface, a beam vertically movable within said support and having steps or shoulders spaced equidistantly apart according to a definite unit of measurement, a manually operable screw for causing micrometric movement of said beam, a graduated dial upon said screw for indicating very slight movement of the beam as by $1/10{,}000$ of an inch, a rotatable, spirally grooved shaft in the support, a projection on the beam engaging the spiral groove to rotate the shaft, a pinion on the shaft, a graduated dial for indicating greater movement of the beam as by twenty-five one thousandths of an inch, and gear teeth on the last named dial meshing with said pinion.

Figure 1:
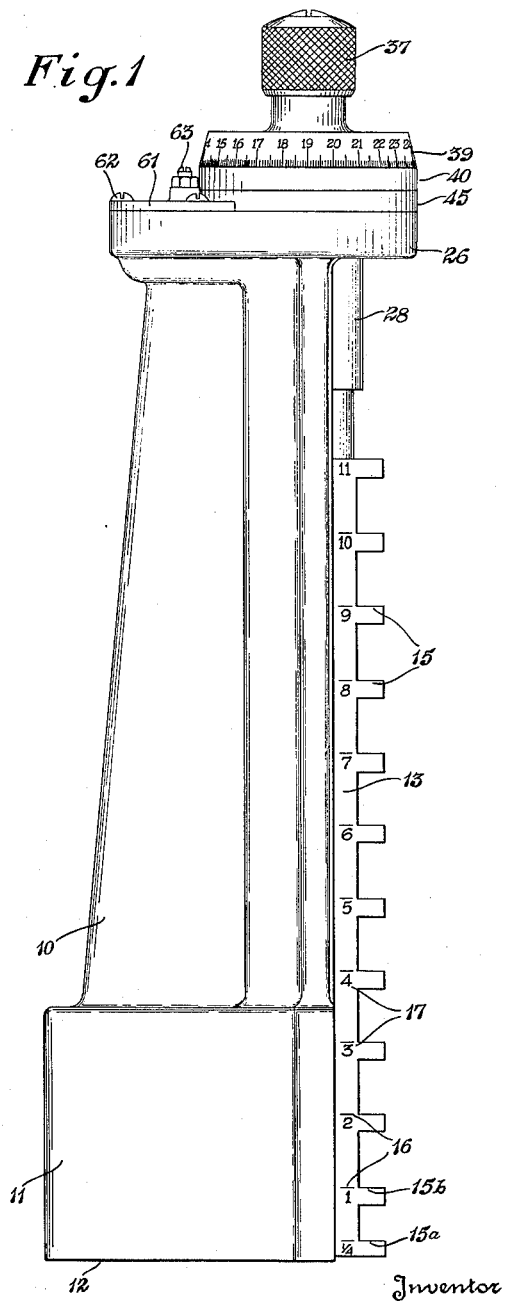
Figure 5:
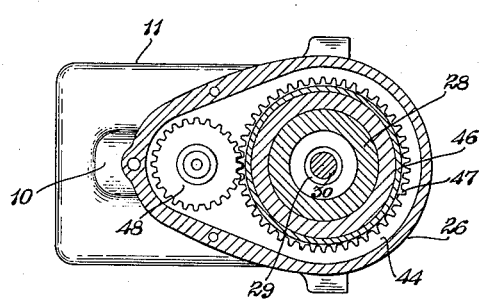
Figure 6:
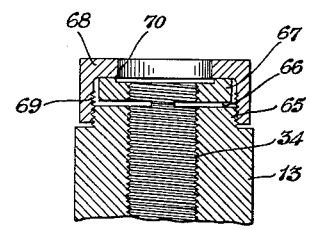
Figure 3:
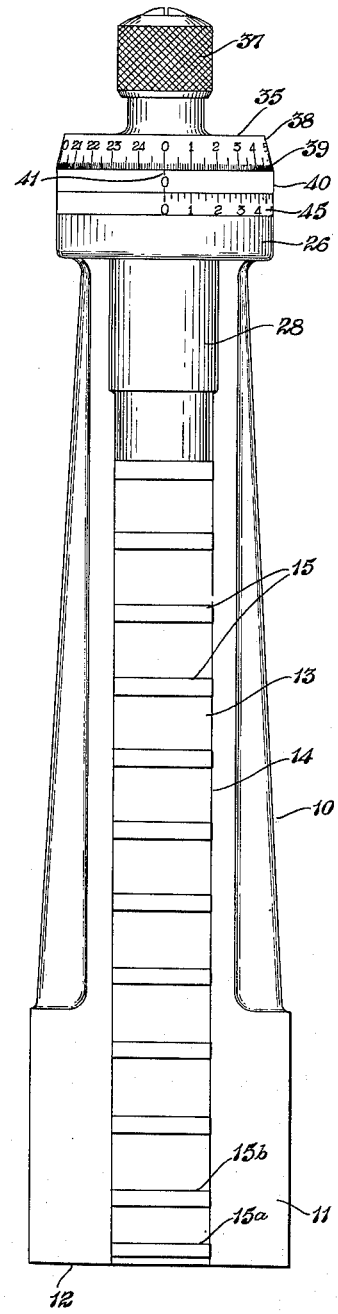
Figure 4:
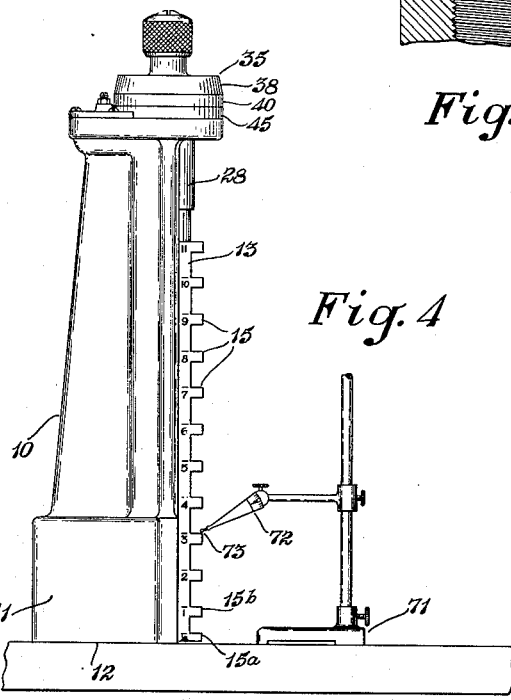

The above objects together with others which will be apparent from the drawings and following description, or which may be later referred to, may be attained by constructing the improved height gauge in the manner hereinafter described in detail and illustrated in the accompanying drawings in which:

Figure 1 is a side elevation of a height gauge embodying the invention;

Fig. 2 a vertical longitudinal, sectional view through the improved height gauge;

Fig. 3 a front elevation of the height gauge shown in Figs. 1 and 2;

Fig. 4 a side elevation of the improved height gauge on a smaller scale showing the manner in which a surface gauge or similar device may be used therewith;

Fig. 5 a transverse sectional view taken on the line 5—5, Fig. 2; and,

Fig. 6 a fragmentary, enlarged section of the device for taking up play or lost motion in the operating screw.

Referring now to the embodiment of the invention illustrated in the drawings, the mechanism forming the improved height gauge is mounted upon a generally channel shape, upright support indicated by the numeral 10, having the enlarged base portion 11 provided with the flat bottom surface 12, which is adapted to be set upon a flat plate or other perfectly level surface, and which is of suitable dimensions to support the instrument in a substantial manner.

Vertically slidably mounted upon the open front side of the channel shape upright support 10 is the beam indicated generally at 13 which may be square or rectangular in cross section and of sufficient diameter to have a sliding fit within the channel groove 14 of the upright support.

The front edge of the beam 13 preferably projects slightly beyond the front surface of the upright support 10 and has formed thereon a plurality of point finders or locators in the form of steps or shoulders 15 located at definitely spaced apart units of measurement.

These steps or shoulders are preferably arranged as shown in the drawings, the lowermost step indicated at 15a being exactly one-quarter inch above the bottom of the beam and the next higher step indicated at 15b being exactly one inch above the bottom of the beam and the remaining steps 15 being exactly one inch apart throughout the height of the beam.

If desired graduated lines as indicated at 16 may be located on the beam adjacent to the steps or shoulders 15, 15a and 15b and numerals indicating the measurement in inches may be associated therewith as shown at 17.

For the purpose of guiding the lower portion of the beam as it is moved vertically within the upright support 10, a recess or cavity 18 is formed in the base portion of the support, communicating with the channel groove 14 therein and a pair of vertical guide rods 19 are mounted in spaced parallel relation within the base portion 11 of the support and through the cavity 18 therein, the upper and lower ends of these guide rods being received in the bores 20 and 21 in the base.

A block 22 is attached to the rear side of the beam, near the lower end thereof, as by screws 23, and is located within the cavity 18 and provided with the spaced vertical bores 24 which may be provided with bushings 25 which are slidably received upon the guide rods 19 so as to accurately guide the lower portion of the beam as it is moved vertically within the support.

The upper end of the support 19 has the forwardly overhanging head 26 formed thereon and provided with the vertical bore 27 in alignment with the channel groove 14, a bushing 28 being tightly fitted within said bore. Ball bearings, indicated generally at 29, may be mounted in spaced relation within the bushing 28 and the unthreaded spindle portion 30 of the screw rod 31 is journalled in said ball bearings, collars 32 and 33 being located at opposite ends of the spindle portion 30 for engagement with the ball bearings 29.

The screw 31 is received within the threaded bore 34 in the upper end of the beam 13, the pitch of the screw being such as to produce the desired micrometric movement of the beam. Preferably the pitch of the threads is such that one complete rotation of the screw will move the beam vertically in the support 25/1000 of an inch.

For the purpose of designating the vertical movement of the beam in ten thousandths of an inch, a dial 35 is fixed to the upper end of the screw rod as by the screw 36 which rigidly connects the knurled knob 37 thereto by means of which the screw may be manually rotated to raise or lower the beam as desired.

This dial is in the form of a hollow cap having the downwardly flared peripheral flange 38 upon which the graduations in ten thousandths of an inch as indicated at 39 may be located.

A stationary dial, indicated generally at 40, having an indicating point or line 41 thereon cooperates with the rotatable dial 35 to indicate micrometric movement of the beam. This stationary dial 40 may be in the form of an annulus rigidly mounted upon the reduced tubular upper end 42 of the support and held therein by the peripheral flange 43 at the upper end of the bushing 28.

The head 26 of the support has a pocket 44 formed therein within which is journalled a dial 45 having the depending annular portion 46 upon which gear teeth 47 are formed. These gear teeth mesh with the pinion 48 upon the vertical spirally grooved shaft 49 which is journalled through the vertical bore 50 in the support, the lower end of the shaft extending into the cavity 51 formed in the intermediate portion of the support and communicating with the channel groove 14 therein.

A block 52 is rigidly connected to the rear surface of the beam as by screws 53 located through the ears 54 on the block, and a vertical bore 55 is formed in the outer portion of the block and provided with a bushing 56 through which the lower portion of the shaft 49 is journalled.

A plunger 57 is slidably mounted in the horizontal bore 58 in the block 52 and is normally urged outward into the spiral groove 59 in the shaft 49 by means of the coil spring 60. A cover 61 may be attached, as by screws 62, to cover the rear portion of the pocket 44 in which the pinion 48 is located and an adjusting screw 63 may be located through the cover 61 and contacts the upper end of the shaft 49 for preventing vertical movement thereof. An anti-friction bearing such as the ball bearing 64 may be mounted in the upper portion of the bore 50 as a journal for the shaft 49.

For the purpose of taking up any play or lost motion between the screw 31 and the internal threads 34 of the beam, the device shown in detail in Fig. 6 may be provided. For this purpose the upper end of the beam is reduced and threaded as indicated at 65 and is slit horizontally from opposite sides toward the center as indicated at 66, the portion of the beam above said horizontal slits being further reduced and unthreaded as shown at 67.

A cap 68, with depending internally threaded peripheral flange 69, is then placed over the upper end of the beam and threaded onto the screw threaded neck 65 thereof engaging the upper end of the beam near the periphery thereof and springing the portions 67 thereof above the slits 66 downward so as to take up any play between the threads 34 of the beam and the screw 31. A central opening 70 is formed in the cap 68, of greater diameter than the screw, so as to permit the screw to operate freely therethrough.

In the operation of the instrument for the purpose of accurately taking or determining measurements, the gauge is placed in upright position upon a flat plate or other perfectly level surface in the position shown in the drawings.

With the beam in lowermost position as shown in the drawings, with both of the dials 35 and 45 registering zero, the top of the lowermost step or shoulder 15a on the beam is exactly one-quarter inch above the surface of the supporting plate and the top of the second step or shoulder 15b is exactly one inch above the surface, the other steps or shoulders 15 being accurately spaced above the supporting surface in measurements of inches.

In order to raise the beam, the knob 37 is rotated by hand, the rotation of the screw 31 within the threads 34 of the beam raising the beam within the support 10. With each complete rotation of the knob 37 the beam will be raised exactly 25/1000 of an inch, and any fraction thereof will be accurately indicated in ten thousandths of an inch by the dial 35.

As the beam 13 is moved upward the plunger 57 carried thereby, engaging the spiral groove 59 in the shaft 49, will rotate said shaft and the pinion 48 thereon and through it and the gear teeth 47 the dial 45 will be rotated, this dial indicating vertical movement of the shaft in larger units of measurement.

In the drawings the numerals on the dial 45 indicate one hundred one thousandths of an inch and this dial is graduated to show accurately 25/1000 of an inch. The gauge is so constructed that it has a maximum raising movement of one inch. Any fractional measurement greater than one-quarter of an inch and up to 12 inches may thus be accurately obtained.

Assuming that the measurement desired is 3.205 inches the knob 37 is rotated until the numeral 2 on the dial 45 registers with the point or line 41 on the stationary dial and the knob 37 is further turned in the same direction until the numeral 5 on the dial 35 registers with the line or point 41. The measurement is then taken from the 3 inch step or shoulder as indicated in Fig. 4, as the top of this shoulder will then be exactly 3.205 inches above the supporting surface.

To transfer this measurement to the work a surface gauge as indicated generally at 71 in Fig. 4 may be placed upon the supporting surface and provided with an indicator as indicated at 72, the contact point 73 thereof being brought into contact with the top of the 3-inch step. The work of course is mounted on the same or a similar flat plate or other level surface so that the measurement may be accurately transferred to the work.

If it is desired to mark a line or point upon the work, a scriber of usual and well known construction may be carried upon the surface gauge 71 instead of the indicator 72 and this scriber may be adjusted to accurately register with any of the lines or workings 15 upon the beam so that the exact measurement may be marked or scribed upon the work. It will be evident that any fractions down to 1/10,000 of an inch may be accurately obtained by this height gauge and indicated upon the dials.

I claim:

1. A height gauge comprising a support having a channel groove therein, a non-rotatable beam vertically slidably movable in said channel groove of the support, means preventing rotation of the beam relative to the support, a series of steps spaced equidistantly apart on said beam according to a definite unit of measurement, means including a manually rotatable element to cause micrometric movement of said beam on the support and a dial fixed upon said manually rotatable element for indicating said micrometric movement of the beam, a second dial rotatably mounted upon the support relative to the first named dial for indicating the number of complete rotations of the first dial to register a vernier reading of the beam's movement, a spirally grooved shaft journalled in the support, a projection upon the rear side of the beam intermediate the ends thereof, a spring loaded plunger in said projection engaging said spirally grooved shaft for rotating the shaft and means operatively connecting the shaft to the second dial.

2. A height gauge comprising a support having a channel groove therein, a non-rotatable beam vertically slidably movable in said channel groove of the support, means preventing rotation of the beam relative to the support, a series of steps spaced equidistantly apart on said beam according to a definite unit of measurement, means including a manually rotatable element to cause micrometric movement of said beam on the support and a dial fixed upon said manually rotatable element for indicating said micrometric movement of the beam, a second dial rotatably mounted upon the support relative to the first named dial for indicating the number of complete rotations of the first dial to register a vernier reading of the beam's movement, a spirally grooved shaft journalled in the support, a projection upon the rear side of the beam intermediate the ends thereof, a spring loaded plunger in said projection engaging said spirally grooved shaft for rotating the shaft and gears operatively connecting the shaft to the second dial.

3. A height gauge comprising a support having a channel groove therein, a beam vertically slidably movable in said channel groove of the support, means preventing rotation of the beam relative to the support, a series of steps spaced equidistantly apart on said beam according to a definite unit of measurement, means including a manually rotatable element to cause micrometric movement of said beam on the support and a dial fixed upon said manually rotatable element for indicating said micrometric movement of the beam, a second dial rotatably mounted upon the support relative to the first named dial for indicating the number of complete rotations of the first dial to register a vernier reading of the beam's movement, a spirally grooved shaft journalled in the support, a spring pressed plunger upon the rear side of the beam intermediate the ends thereof engaging said spirally grooved shaft for rotating the shaft and means operatively connecting the shaft to the second dial.

4. A height gauge comprising a support having a channel groove therein, a beam vertically slidably movable in said channel groove of the support, means preventing rotation of the beam relative to the support, a series of steps spaced equidistantly apart on said beam according to a definite unit of measurement, means including a manually rotatable element to cause micrometric movement of said beam on the support and a dial fixed upon said manually rotatable element for indicating said micrometric movement of the beam, a second dial rotatably mounted upon the support relative to the first named dial for indicating the number of complete rotations of the first dial to register a vernier reading of the beam's movement, a spirally grooved shaft journalled in the support, a spring pressed plunger upon the rear side of the beam intermediate the ends thereof engaging said spirally grooved shaft for rotating the shaft and gears operatively connecting the shaft to the second dial.

5. A height gauge comprising a support having a channel groove therein, a beam vertically slidably movable in said channel groove of the support, means preventing rotation of the beam relative to the support, a series of steps spaced equidistantly apart on said beam according to a definite unit of measurement, a screw journalled in the support and threaded into the beam to cause micrometric movement of said beam on the support and a dial fixed upon the screw for indicating said micrometric movement of the beam, a second dial rotatably mounted upon the support relative to the first named dial for indicating the number of complete rotations of the first dial to register a vernier reading of the beam's movement, a spirally grooved shaft journalled in the support, a spring pressed plunger upon the rear side of the beam intermediate the ends thereof engaging the spirally grooved shaft for rotating the shaft and means operatively connecting the shaft to the second dial.

6. A height gauge comprising a support having a channel groove therein, a beam vertically slidably movable in said channel groove of the support, means preventing rotation of the beam relative to the support, a series of steps spaced equidistantly apart on said beam according to a definite unit of measurement, a screw journalled in the support and threaded into the beam to cause micrometric movement of said beam on the support and a dial fixed upon the screw for indicating said micrometric movement of the beam, a second dial rotatably mounted upon the support relative to the first named dial for indicating the number of complete rotations of the first dial to register a vernier reading of the beam's movement, a spirally grooved shaft journalled in the support, a spring pressed plunger upon the rear side of the beam intermediate the ends thereof engaging the spirally grooved shaft for rotating the shaft and gears operatively connecting the shaft to the second dial.

JOSEPH N. BENNETT.

REFERENCES CITED

The following references are of record in the file of this patent:

UNITED STATES PATENTS

| Number | Name | Date |
|---|---|---|
| 506,703 | Lynch | Oct. 17, 1893 |
| 1,389,028 | Colburn | Aug. 30, 1921 |
| 1,444,565 | Smith | Feb. 6, 1923 |
| 1,519,602 | Zimmerman et al. | Dec. 16, 1924 |
| 2,135,316 | Whistler et al. | Nov. 1, 1938 |
| 2,440,710 | Bauer | May 4, 1948 |